June 22, 1954  S. B. BLODGETT ET AL  2,681,601
SETTING TYPE SHUTTER WITH BUILT-IN
FLASH SYNCHRONIZING MECHANISM
Original Filed June 13, 1947                                    4 Sheets-Sheet 1

INVENTORS
STEWART B. BLODGETT
STEVE RONAI
BY
Watson, Johnson, Leavenworth & Blair
ATTORNEYS INVENTORS
STEWART B. BLODGETT
STEVE RONAI
BY
Watson Johnson Leavenworth & Blair
ATTORNEYS

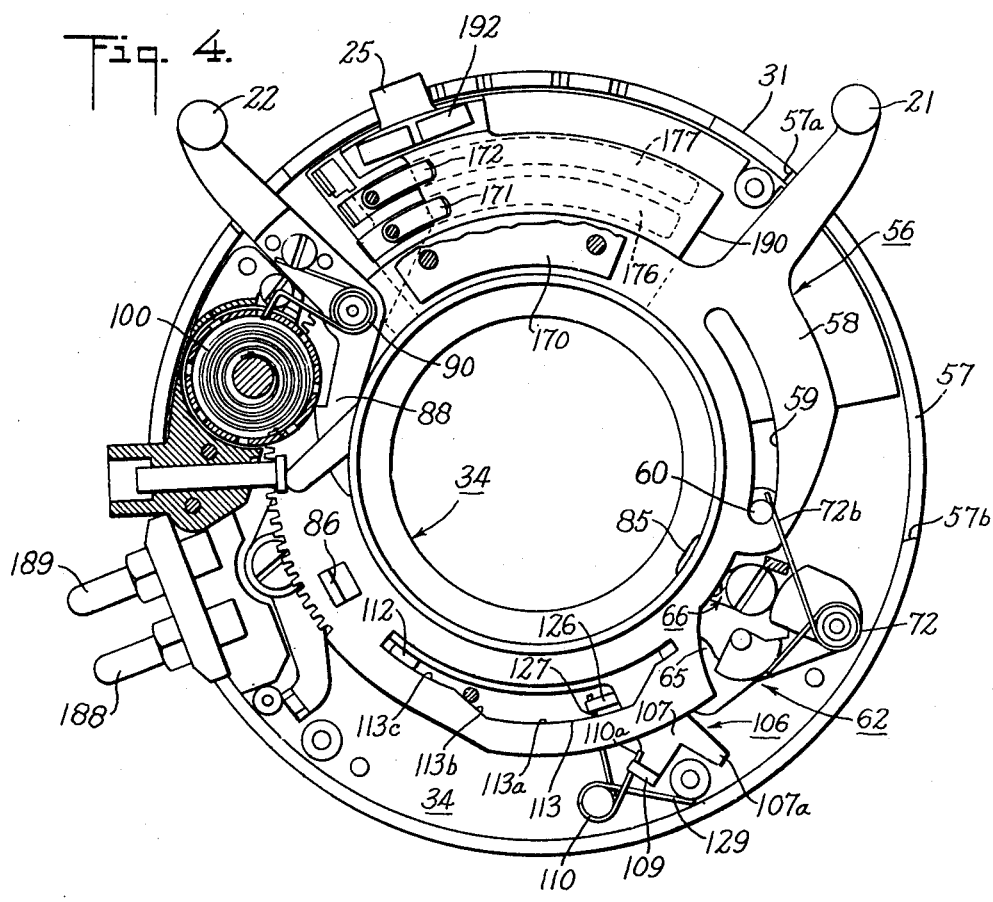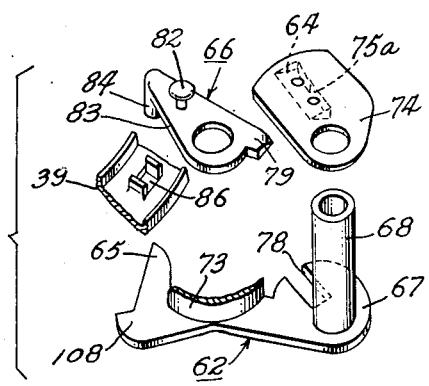

June 22, 1954
S. B. BLODGETT ET AL
SETTING TYPE SHUTTER WITH BUILT-IN
FLASH SYNCHRONIZING MECHANISM
2,681,601
Original Filed June 13, 1947
4 Sheets-Sheet 4
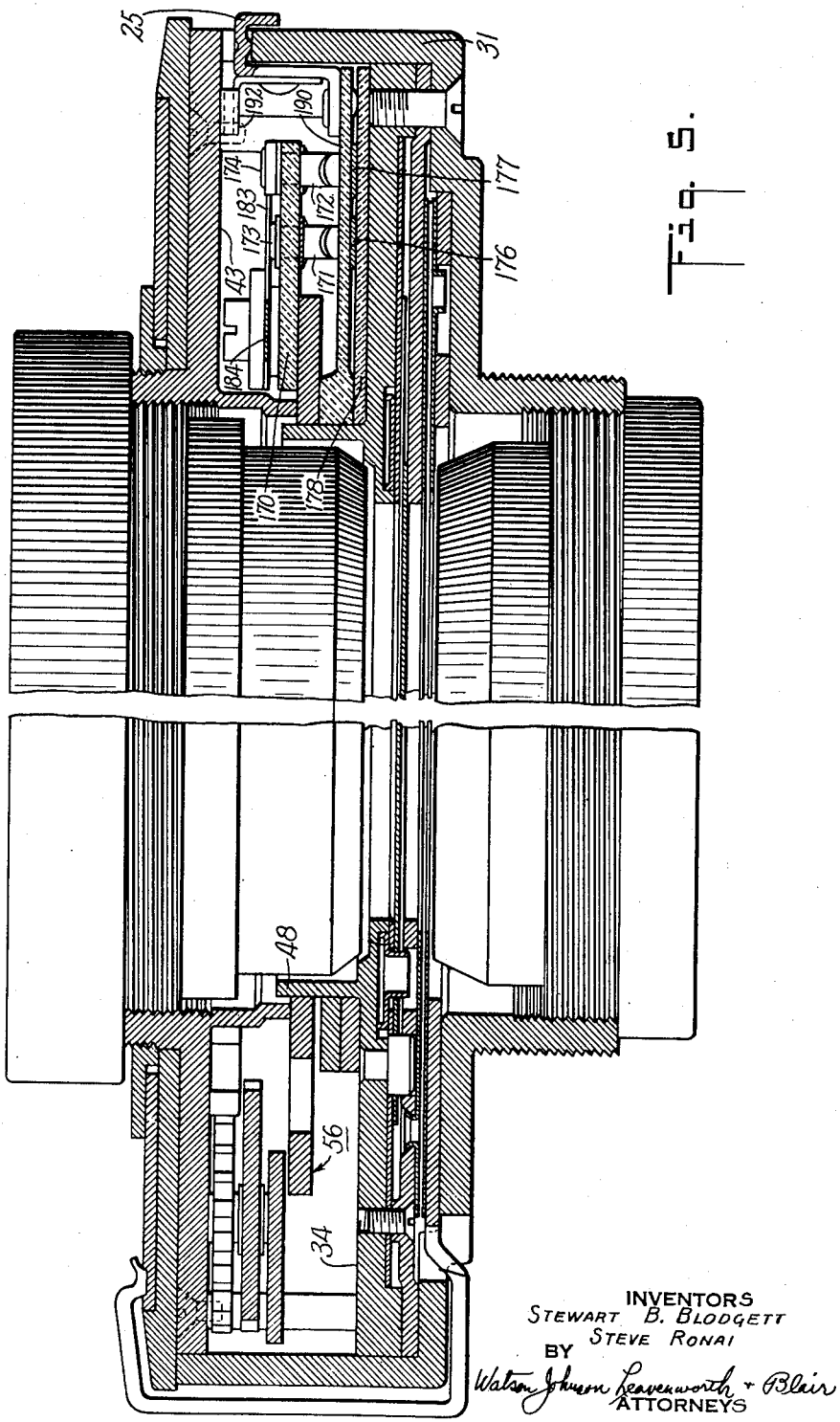
INVENTORS
STEWART B. BLODGETT
STEVE RONAI
BY
Watson Johnson Leavenworth + Blair
ATTORNEYS

Patented June 22, 1954

2,681,601

UNITED STATES PATENT OFFICE 2,681,601

SETTING TYPE SHUTTER WITH BUILT-IN FLASH SYNCHRONIZING MECHANISM

Stewart B. Blodgett, Cedar Grove, N. J., and Steve Ronai, Greenlawn, N. Y., assignors to Fairchild Camera and Instrument Corporation, Jamaica, N. Y., a corporation of Delaware Original application June 13, 1947, Serial No. 754,560. Divided and this application October 3, 1951, Serial No. 249,522

10 Claims. (Cl. 95—11.5)

This invention relates to a flash bulb synchronizing mechanism incorporated with a camera shutter, and is a division of our copending application, Serial No. 754,560, entitled "Camera Shutter," filed June 13, 1947, and now abandoned.

Commercial requirements are such that modern shutters of the nature here under consideration must be equipped with synchronizing mechanism by which the shutter operation may be accurately synchronized with that of a photo-flash bulb, to the end of attaining the full benefit of the peak illumination of the flash bulb. One type of shutter utilizes a separate lever by which the synchronizing unit may be wound and engaged at any time so that a flash bulb can be carried in the socket and used by merely setting the lever. However, because flash pictures are usually taken in sequence, there is the possibility of forgetting to wind the synchronizing lever. Hence, if the flash fails to fire, there is no way of telling whether the bulb was faulty or the lever was not wound. Furthermore, if the lever has been set in such a mechanism, there is no way of unsetting it if the flash is not desired.

In another commercially available shutter including a synchronizing mechanism, the synchronizer setting is accomplished by winding the shutter itself. This particular shutter also includes an adjustment whereby the synchronizing mechanism may be selectively preset for delayed operation up to approximately twenty milliseconds. This adjustment is, however, so related to the shutter winding mechanism that it must be set prior to setting of the shutter and accordingly the synchronizing mechanism. In other words, the time delay adjustment may not be set subsequent to the setting of the synchronizing mechanism. Furthermore, if the shutter is set with the synchronizing adjustment in the "off" position, the flash bulb cannot be flashed unless the shutter is tripped and rewound. This condition would, of course, be quite unsatisfactory where the camera is provided with a double exposure prevention device. Still further, if the shutter has been wound or set with the synchronizer adjustment in any of its desired positions other than the "off" position, the adjustment cannot be moved to the "off" position without closing the synchronizer contacts, and therefore needlessly firing the flash bulb.

It should also be noted in connection with synchronizer mechanisms in known shutters that there is a delay between the time the shutter is tripped and the start of the movement of the blade actuating mechanism, due to the necessary delay for ignition of the flash bulb. This delay is the same with any position of the synchronizer adjustment, but is not present when the synchronizer is not used. When following fast action, a photographer can become accustomed to a given delay in the same manner that a trap shooter learns to lead clay pigeons. However, if the photographer must compensate for different delay periods, it is much more difficult to accustom himself to his camera.

It is accordingly among the objects of this invention to provide a shutter which is relatively simple in construction and thoroughly dependable in operation, and which overcomes the above-mentioned objections and disadvantages in addition to others in an efficient and practical manner.

The shutter operating mechanism comprises illustratively a ring-like setting member operatively associated with a master operating member which is cammed to set position when the setting lever is set, and which upon release oscillates the blade driving ring by means of an intermediate actuating lever directly connected to the blade ring. The winding lever also comprises a part of the synchronizing mechanism whereby the synchronizing mechanism is wound when the shutter is wound and hence is ready for use at all times. Thus the shutter speed is not affected when the synchronizing mechanism is brought into operation and the delay between tripping of the shutter and opening of the blades is constant regardless of synchronizer setting. The synchronizer mechanism also includes a manual adjustment for timing the closing of the synchronizer circuit in accordance with the time lag characteristic of the particular bulb being used. The synchronizer mechanism also includes a safety switch which is automatically closed when the winding lever is set to condition the synchronizer circuit for subsequent operation. The safety switch is also automatically opened at the end of the cycle of operation, thus precluding the possibility of inadvertent firing of a flash bulb.

Referring now to the drawing, wherein we have shown a preferred embodiment of our invention, Figure 1 is a front elevation showing the shutter with the diaphragm plate removed to show the winding lever, i. e., the setting ring, the master operating member, and associated latches, and the synchronizing mechanism;

Figure 2A is an enlarged exploded perspective view of the master member and blade driving ring connection, portions being broken away;

Figure 4 is an elevation showing structural details of the setting ring, drive spring and of the synchronizer mechanism;

Figure 5 is an enlarged sectional elevation showing various of the structural features of the synchronizing mechanism; and, Figure 6 is a reduced top plan view of the shutter.

Similar reference characters refer to similar parts throughout the views of the drawing.

Figure 1:
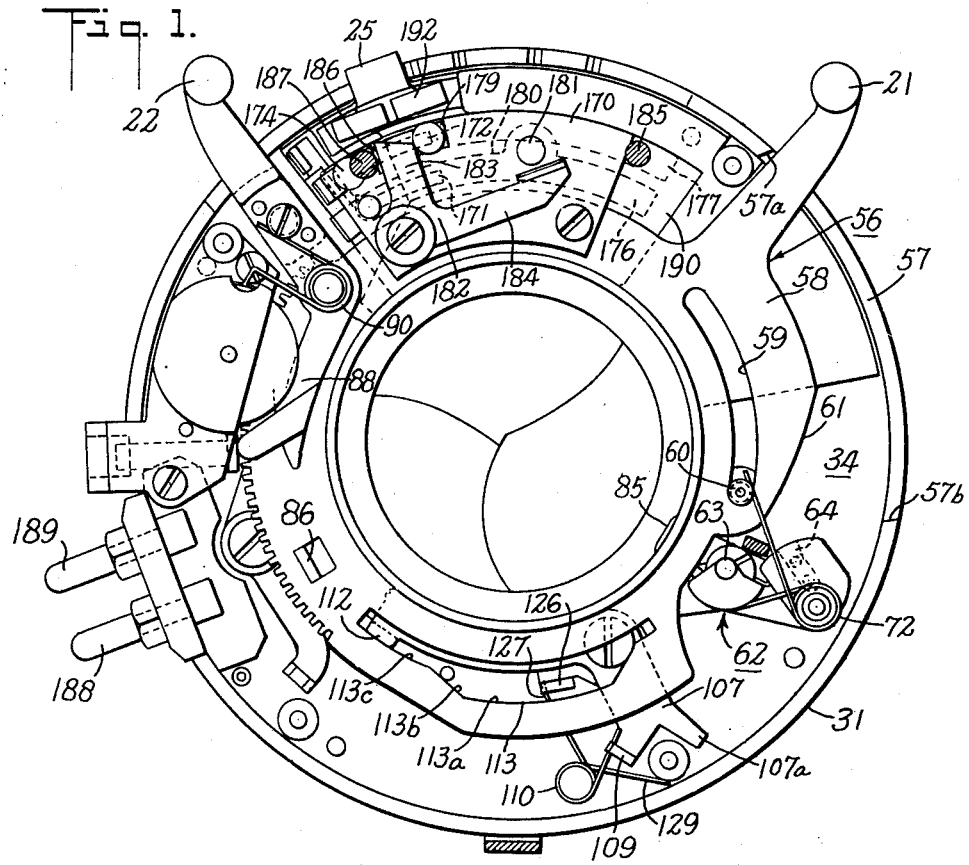
Figure 2:
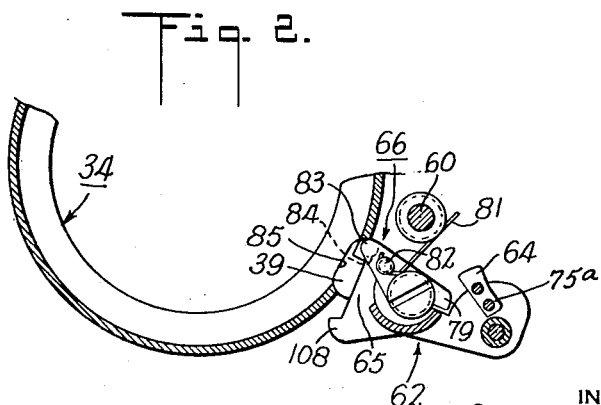
Figure 2 is a fragmentary skeletonized view, partly in section, showing structural details of the master operating member.

As shown in Figures 1 and 2, the shutter operating mechanism includes a setting or priming ring, generally indicated at 56, whose inner periphery encircles and bears against the outer surface of projection 48 of plate 34 (see also Figure 5). Setting lever 21 is preferably an integral portion of this ring and extends through a slot 57 in casing wall 31, the ends 57a and 57b of which may, if desired, define the limits of oscillation of the setting lever and accordingly ring 56 during the setting and release movement thereof. However, as that portion of setting lever 21 which would engage slot end 57a when the shutter is tripped attains substantial angular velocity and would accordingly strike slot end 57a with substantial impact, we preferably provide setting ring 56 with a widened portion 58 wherein there is cut an arcuate slot 59 adapted to receive a pin 60, this pin being fastened to and extending upwardly from supporting plate 34. Thus the ends of slot 59 determine the limits of oscillation of setting ring 56 and being nearer to the center of oscillation, attain a considerably lesser angular velocity than does the outer end of setting lever 21, thus reducing the impact of the setting ring 56 against pin 60 at the end of the stroke of the ring when the shutter is tripped. This advantageously results in less strain on the ring itself, and in lesser transmitted shock to the several other portions of the shutter.

Figure 3:
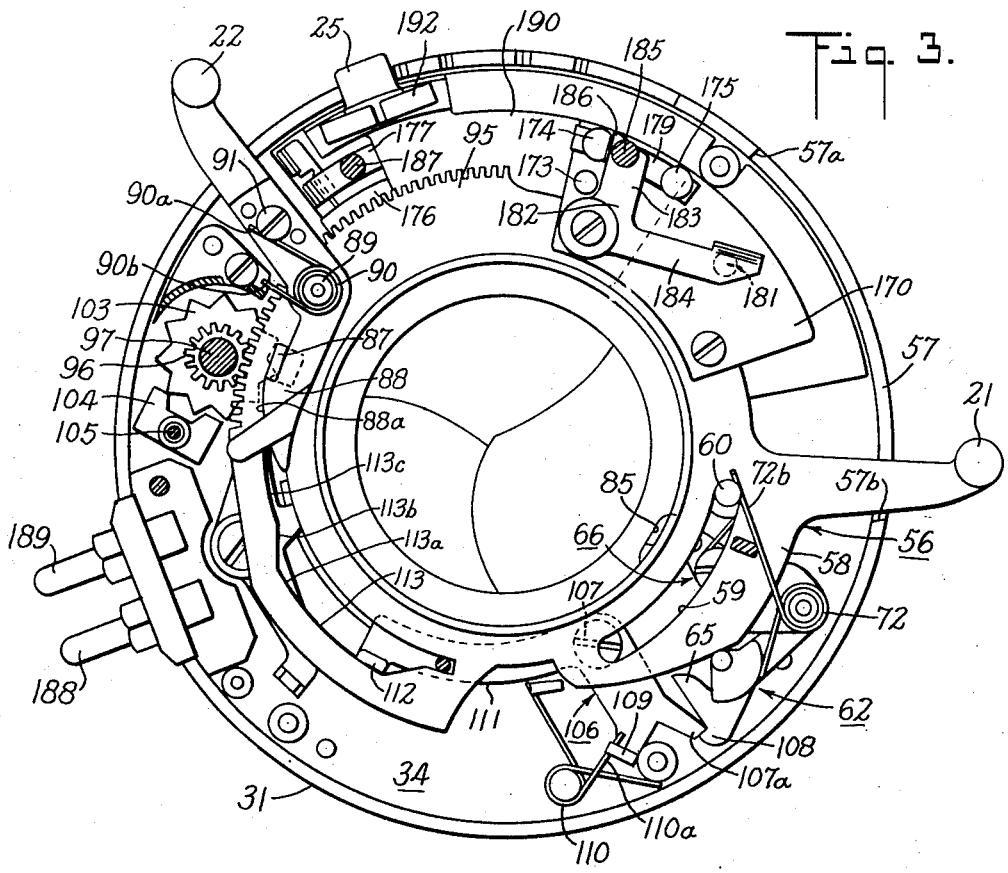
Figure 3 is an elevation similar to Figure 1, but showing the setting ring, master operating member, release latch and trigger in set position, and also the synchronizer mechanism in set position.

Setting ring portion 58 also advantageously provides a cam surface 61 which is utilized to set a master operating member, generally indicated at 62. This member includes a control surface 63, adapted to be engaged by cam 61 of setting ring 56 during the setting operation and, as shown in Figures 1 and 2, a pair of shutter operating portions 64 and 65 which when the shutter is released successively engage a shutter actuating lever, generally indicated at 66, to open and close the shutter, the foregoing structure and its function being described in detail in our aforesaid application. During the setting operation, i. e. when the setting ring 56 engages control portion 63 of the master operating member 62 to rock the member counterclockwise, as viewed in Figures 2 and 2A, bar 75a rides up and over a beveled end 79 of actuating lever 66 and then drops behind portion 79 of the actuating lever when the master operating lever is in set position, as shown in Figure 3.

When the shutter is tripped, as will be hereinafter described, the master operating member 62 is released so that its spring 72 may drive it clockwise. During this movement of the master operating member, its operating end 64 of bar 75a engages the thicker or operating side of end 79 of actuating lever 66 and accordingly rocks lever 66 counterclockwise, as viewed in Figure 3. This movement of the lever opens the shutter blades. When, during the movement of the master operating lever, bar 75a and lever end 79 reach the positions shown in Figure 4, which positions are coincident with maximum shutter blade opening, the radial surface of bar 75a which held blades in the open position rides past the operating surface of lever end 79, thus in effect conditioning lever 66 for return or clockwise movement, which movement closes the shutter blades.

The shutter actuating lever 66 (Figure 2) is pivotally mounted on a stud (not shown) which extends through the lever and is riveted into supporting plate 34. The head of this stud carries the coils of a spring 81, one end of which is anchored by a button 82 fastened to lever 66, and the other end of which bears against pin 60. Spring 81 thus biases lever 66 clockwise, i. e. toward shutter closing direction. Lever 66 also includes an end 83 which is adapted to be engaged by operating end 65 of master operating member 62 during clockwise movement of the master operating member. This end 83 of lever 66 has formed thereon a downwardly extending pin 84 which extends through a slot 85 in supporting plate 34 and into a hole formed in the blade driving ring 39, thus to form a driving connection between actuating lever 66 and the blade ring. It may now be seen that after lever 66 has been rocked counterclockwise to the Figure 4 position by bar 75a of the master operating member and this bar has disengaged lever end 79, operating end 65 of the master operating member is disengaging end 83 of lever 66. When this end of the master operating member engages lever 66 it, together with spring 81, drives lever 66 clockwise so that lever pin 84 (Figure 2) drives blade ring 39 in blade closing direction.

It may now be seen that the blade ring 39 is directly connected to actuating lever 66 so as to be positively driven thereby in both opening and closing directions. It may further be seen that the actuating lever 66 is also positively driven by the master operating member, which member directly engages the lever and at no time engages the blade ring or any part integral therewith or rigidly fastened thereto. It may still further be seen that both the actuating lever 66 and the master operating member 62 are of such small size and move through such limited arcs as not to have any substantial inertia on the one hand, and as not to attain any substantial momentum on the other. Thus it is possible to attain accurate high shutter speeds without the necessity of a booster spring or the like which has frequently been resorted to heretofore as an expedient to attain higher shutter speeds. Indeed, all that is necessary to attain such higher shutter speeds is to increase the tension of spring 72 in a manner that will be described hereinafter.

Winding ring 56 must, of course, be provided with means for holding it in its set or wound position, which position is shown in Figure 3. To this end, the winding ring is provided with an upstruck lug 87 which is adapted to be engaged by the hooked end 88 of a trigger 22. Trigger 22 is pivotally mounted on a post 89 pivoted to plate 34, the upper end of the post carrying the coils of a spring 90, one end 90a of which rests against a screw 91 carried by the trigger and the other end 90b of which is anchored in any suitable manner. This spring accordingly biases the trigger clockwise so that when winding ring 56 is turned clockwise to be set, its lug 87 rides over the curved end 88a of hook 88, rocking the trigger counterclockwise until the lug falls back of the shoulder on the hook, thus releasing the trigger for limited clockwise movement by spring 90 to lock lug 87 and accordingly ring 56 in set position.

Means are provided to drive winding ring 56 counterclockwise upon release thereof by trigger 22. Thus ring 56 includes a toothed portion 95 (Figure 3) adapted to mesh with a pinion 96 which may be driven by a coiled spring 100 (Figure 4) as described in our said application. It accordingly follows that when trigger 22 is rocked counterclockwise, as viewed in Figure 3, to release winding ring 56, spring 100 (Figure 4) drives pinion 96 (Figure 3) which, in turn, drives the toothed section 95 of the winding ring, thus rotating the winding ring counterclockwise.

As the winding ring also carries a portion of the flash bulb synchronizing mechanism described hereinafter, it is not desirable that the winding ring upon release rotate at two rapid a rate. To this end, we have provided a retard device comprising a star wheel 103 which may be attached to or integral with shaft 97, and a cooperating pallet 104 pivotally mounted on a shaft 105 mounted between supporting plate 34, and bracket 94.

Winding ring 56 is also utilized to trip master operating member 62 in a manner which will now be described. As shown in Figure 3, a latch generally indicated at 106 is pivotally mounted on a stud 107 secured to plate 34. This latch includes a short arm 107 having an end 107a adapted to engage a shoulder 108 formed on the end of master operating member 62. Arm 107 of the latch is also provided with a lug 109 against which one end 110a of a spring 110 bears to put latch 106 under a counterclockwise bias. Thus spring 110 constantly forces the latch in master member engaging direction so that when the master member 62 is set by setting ring 56, as before described, it is automatically latched in set position by end 107 of the latch. Latch 106 also includes a long arm 111 on the end of which is formed an upstanding lug 112 adapted to ride in a cutout portion or slot 113 of winding ring 56. This slot includes surfaces 113a, 113b and 113c with each of which latch lug 112 coacts for different positions of winding ring 56. Thus when the winding ring is in its rest position (see Figure 1) latch lug 112 rides against slot surface 113c, the latch accordingly being forced against the bias of spring 110 into release position. When, however, winding ring 56 is rocked clockwise to its Figure 3 position, latch lug 112 rides against slot surface 113a, permitting spring 110 to rock the latch to its latching position with respect to master member 62, wherein it holds the master member in set position.

When trigger 22 is rocked to release the winding lever 56, the winding ring of course rotates counterclockwise, and as it does so, its slot surface 113b eventually engages latch lug 112 so that continued movement of the winding ring rocks latch 106 clockwise and pulls its end 107a from behind master member shoulder 108, thus releasing the master member to operate the shutter blade actuating lever 66 in the manner hereinbefore described. By effecting release of the master member in this manner, the force of the master member spring 72 is not exerted directly on trigger 22 and hence a soft trigger action results. By virtue of the length of latch arm 111 and the slope of winding lever slot surface 113b, substantial mechanical advantage is attained which readily and easily effects the release of master member 62 without jarring the mechanism. Thus the combination of the "soft" trigger action and the high mechanical advantage afforded by the long latch arm and slot surface 113b results in an extremely smooth, overall tripping operation permissive of high, instantaneous shutter speeds, without jarring or shaking the shutter as a whole.

*Synchronizing mechanism*

Modern photographic requirements are such as to make it practically obligatory to provide mechanism for firing a flash bulb synchronously with shutter operation. In view of the fact that flash bulbs of different manufacture are characterized by different lag characteristics varying from 1 to 20 milliseconds, the synchronizing mechanism, to be efficient, should include an adjustment for compensating for these different lag characteristics. Furthermore, to avoid exterior bulkiness and complicated accessories, it is desirable that the synchronizing mechanism be built into the shutter, i. e. enclosed in the shutter housing. To these ends, we have provided the synchronizing mechanism which will now be described.

Referring first to Figure 1, winding ring 56 has screwed thereto an arcuate plate 170 made of a suitable dielectric material and having secured to the underside thereof a pair of resilient contact shoes 171 and 172 (see also Figure 5) as by rivet 173 for shoe 171, and rivets 174 and 175 (Figure 3) for the other shoe. These shoes are adapted to ride or wipe over stationary contact strips 176 and 177 respectively (Figures 1 and 5), which are mounted on an insulating plate 178 secured to supporting plate 34 in any suitable manner.

Still referring to Figure 1, shoe 172 may comprise an integral part of a metal strip which is bent around the left-hand end of plate 170 and overlies the top thereof as at 179 (see Figure 3). It is through this portion of strip 179 that rivets 174 and 175 extend. Shoe 171 (Figure 1) is electrically connected to an arcuate strip 180, the right-hand end of which is fastened to plate 170 by a rivet 181 electrically connected to strip 180. Thus, as shown in Figure 3, strip 179 and rivet 181 conveniently comprise a pair of switch contacts for a safety switch which includes a pivoted lever 182 having arms 183 and 184 adapted respectively to engage rivet 181 and contact 179 when the winding lever 56 is set.

This automatic setting of the safety switch is effected by a pin 185 which is secured to and extends downwardly from the front cover plate 43 (this plate is shown in Figure 5) in such a position as to engage an upstruck lug 186 on switch arm 183 when the switch arm is swung to the Figure 3 position, when winding ring 56 is set. Engagement of switch arm lug 186 by pin 185 swings both switch arms 183 and 184 counterclockwise, thus to effect engagement between arm 183 and contact 179 and arm 184 and contact 181, thus electrically connecting contacts 179 and 181 and accordingly the two wiper shoes 172 and 171. When the shutter is tripped, however, and winding ring 56 is released, as hereinbefore described, the winding ring rotates counterclockwise, carrying with it switch 182. Just before the winding arm, reaches the end of counterclockwise movement, switch lug 186 engages another pin 187, which is also secured to and extends down from front cover plate 43. Engagement of lug 186 with pin 187 accordingly rocks switch lever 182 clockwise and disengages its arm 184 from contact 181 thus breaking the electrical connection between wiper shoes 172 and 171. Thus it may be seen that switch lever 182 is both a safety switch and a flash bulb circuit conditioning switch, i. e. when the winding lever is set, the switch acts as a conditioner for the flash circuit by electrically connecting the wiper shoes. On the other hand, when the winding ring is released, the electrical connection between the wiper shoes is broken, so that a new flash bulb may safely be connected into the circuit without being fired.

Contact strips 176 and 177 are respectively wired or electrically connected in any suitable manner to a pair of jacks 188 and 189 which receive a socket element (not shown) of the flash bulb circuit. Accordingly it follows that when wiper contacts 171 and 172 are electrically connected, as hereinbefore described, and engage contact strips 176 and 177, the photo-flash circuit is closed to fire the flash bulb.

As we have hereinbefore noted, flash bulbs of different manufacturers have different lag characteristics which must be compensated for if the exposure is to be synchronized with the peak illumination of the bulb. To this end, we have provided an adjustable dielectric shield which may conveniently take the form of an arcuate insulating plate 190 (Figure 4) to which is attached lever 25, extending through a slot in casing wall 31 for ready accessibility. As is better shown in Figure 5, lever 25 has secured thereto a resilient bearing shoe 192, which bears against the bottom of front cover plate 43 and accordingly holds insulating plate 190 in proper operative position over contact strips 176 and 177 and under contact shoes 171 and 172, thus shielding the strips from the shoes.

Figure 6:
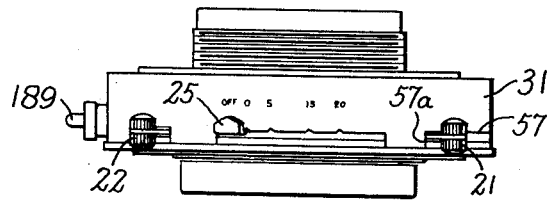

As shown in Figure 6, adjusting lever 25 registers over a scale on casing side 31 having indicia indicative of different synchronizer adjustment positions ranging from "off" to 20 milliseconds. When the lever is in the "off" position, shield 190 is in the Figure 4 position, wherein contact strips 176 and 177 are completely shielded from wiper shoes 171 and 172. When, however, the fingerpiece is moved to any of the other indicated positions, the contact strips 176 and 177 are proportionately exposed. Thus, if a given flash bulb has negligible lag characteristics, lever 25 (Figure 6) might be set in the zero position, wherein shield 190 would expose only a small portion of strips 176 and 177 for engagement by wiper shoes 171 and 172 only at the end of their travel, at which position the shutter blades are wide open. Where, however, the flash bulb has substantial lag characteristics, lever 25 would be set at the "20" position, wherein shield 190 would expose a substantial portion of contact strips 176 and 177. Under these conditions, the wiper shoes 171 and 172 would engage the contact strips and accordingly close the flash circuit before opening movement of the shutter blades so that by the time the flash bulb fired, the shutter blades would be wide open, thus to obtain the benefit of peak illumination of the bulb and accordingly compensate for its lag.

It may now be seen that by incorporating the synchronizing mechanism with the winding lever 56 and accordingly disassociating the synchronizing mechanism from the master member 62, the shutter opening and closing spring 72 does not have to carry the load of the synchronizing mechanism, and the timing of the synchronizing mechanism is divorced from the shutter operating mechanism, thus making it relatively easy to time the synchronizer to the shutter. Furthermore, by associating the synchronizer mechanism with the winding lever, rather than with the master member, the synchronizer may be built into a portion of the shutter wherein it is most easily accommodated, thus obviating structural complexities which might otherwise obtain.

Also, as setting ring 56 both trips the master member 62 and drives the synchronizer, there is never any variation in the delay between operation of trigger 22 and tripping of the master member, regardless of whether the synchronizing system is being used or not.

Thus we have provided a synchronizing mechanism for a shutter which attains the several objects set forth hereinbefore in a thoroughly practical and efficient manner.

As many possible embodiments may be made of the above invention and as many changes might be made in the embodiments above set forth without departing from the scope thereof, it is to be understood that all matter hereinbefore set forth or shown in the accompanying drawings is to be interpreted as illustrative only and not in a limiting sense.

We claim:

1. A flash bulb synchronizing mechanism for a photographic setting type shutter having a settable setting and operating ring movable between rest and set positions in the shutter housing and trippable from its set position, a shutter blade driving means operatively mounted in the shutter housing and a settable master member for driving said blade driving means when tripped and movable between set and released positions, cooperating means being provided on the setting ring and the master member for moving the master member to set position when the setting ring is rotated to set position, means also being provided and operable by the setting ring upon movement thereof toward its rest position to trip the master member, said mechanism including a dielectric plate fastened to said ring and movable therewith, a pair of contactors mounted on said plate, a pair of stationary contacts on the shutter housing lying respectively in the path of movement of said contactors and engageable thereby during the movement thereof, said contacts comprising elements of a flash bulb circuit which when bridged energize the circuit, a member movably mounted on said plate and movable to electrically connect said contactors, and means in the path of said member to move said member when said ring is moved to its set position to electrically connect said contactors, whereby when said contactors engage said contacts upon movement of said ring toward its rest position the contacts are bridged to energize the circuit.

2. A flash bulb synchronizing mechanism for a photographic setting type shutter having a settable setting and operating ring movable between rest and set positions in the shutter housing and trippable from its set position, a shutter blade driving means operatively mounted in the shutter housing and a settable master member for driving said blade driving means when tripped and movable between set and released positions, cooperating means being provided on the setting ring and the master member for moving the master member to set position when the setting ring is rotated to set position, means also being provided and operable by the setting ring upon movement thereof toward its rest position to trip the master member, said mechanism including a dielectric plate fastened to said ring and movable therewith, a pair of contactors mounted on said plate, a pair of stationary contacts on the shutter housing lying respectively in the path of movement of said contactors and engageable thereby during the movement thereof, said contacts comprising elements of a flash bulb circuit which when bridged energize the circuit, a member movably mounted on said plate and movable to electrically connect said contactors, means in the path of said member to move said member when said ring is moved to its set position to electrically connect said contactors, whereby when said contactors engage said contacts upon movement of said ring toward its rest position the contacts are bridged to energize the circuit, and means in the shutter housing cooperative with said member to operate said member to disconnect said contactors at the end of the travel of said ring.

3. A flash bulb synchronizing mechanism for a photographic setting type shutter having a settable setting and operating ring movable between rest and set positions in the shutter housing and trippable from its set position, a shutter blade driving means operatively mounted in the shutter housing and a settable master member for driving said blade driving means when tripped and movable between set and released positions, cooperating means being provided on the setting ring and the master member for moving the master member to set position when the setting ring is rotated to set position, means also being provided and operable by the setting ring upon movement thereof toward its rest position to trip the master member, said mechanism including a dielectric plate fastened to said ring and movable therewith, a pair of contactors mounted on said plate, a pair of stationary contacts on the shutter housing lying respectively in the path of movement of said contactors and engageable thereby during the movement thereof, said contacts comprising elements of a flash bulb circuit which when bridged energize the circuit, a member movably mounted on said plate and movable to electrically connect said contactors, means in the path of said member to move said member when said ring is moved to its set position to electrically connect said contactors, whereby when said contactors engage said contacts upon movement of said ring toward its rest position the contacts are bridged to energize the circuit, and means adjustably mounted in the shutter housing to variably determine the time at which said contacts are engaged by said contactors during the movement of said ring and accordingly said plate from its set to its rest position.

4. Apparatus in accordance with claim 1, wherein said member comprises a lever pivotally attached to said plate and having two arms which respectively engage said contactors when said ring is moved to set position.

5. Apparatus in accordance with claim 1, wherein a pin is secured to the shutter housing and is located to engage said member when said ring is moved to operate said member to electrically connect said contactors.

6. Apparatus in accordance with claim 1, wherein said contactors comprise two metallic strips one of which wholly underlies said plate and is fastened thereto by a metallic rivet extending therethrough with an exposed upper end and the other of which has portions on both sides of said plate, said member when in contactor engaging position engaging said rivet and the upper portion of said other contactor.

7. Apparatus in accordance with claim 2, wherein said disconnecting means comprises a pin in the shutter housing projecting into the path of said member to operate said member to electrically disconnect said contactors.

8. Apparatus in accordance with claim 1, wherein said member comprises a lever pivotally attached to said plate and having two arms which respectively engage said contactors when said ring is moved to set position, a pin secured to the shutter housing and located to engage one of said lever arms when said ring is moved to set position, thereby to pivot said lever to its contactor engaging position, and a second pin secured to the shutter housing and located to engage said lever arm when said ring moves to its rest position thereby to pivot said lever to its contactor disengaging position.

9. Apparatus in accordance with claim 3, wherein said adjustably mounted means comprises a non-conductive member slidably mounted in the shutter housing and adjustably disposed between said plate and said contacts, said contacts being arcuate and elongated, and a finger piece attached to said non-conductive member for sliding it relative to the fixed position of said contacts so that more or less of the surfaces of said contacts can be selectively shielded thereby to predetermine the point of engagement between said contactors and said contacts upon movement of said contactors toward the rest position of said ring.

10. Apparatus in accordance with claim 3, wherein said adjustably mounted means is movable to a position to preclude engagement between said contacts and said contactors.

References Cited in the file of this patent

UNITED STATES PATENTS

| Number | Name | Date |
| --- | --- | --- |
| 2,256,354 | Riddell | Sept. 16, 1941 |
| 2,319,086 | Riddell | May 11, 1943 |
| 2,358,941 | Schwarz | Sept. 26, 1944 |